G. P. MacNICHOL.
GLASSWARE FORMING MECHANISM.
APPLICATION FILED MAR. 4, 1914.
1,343,179.
Patented June 8, 1920.
4 SHEETS—SHEET 4.
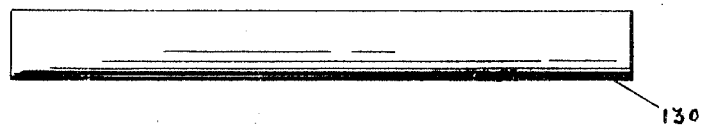
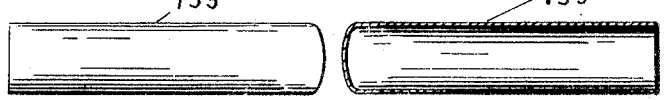
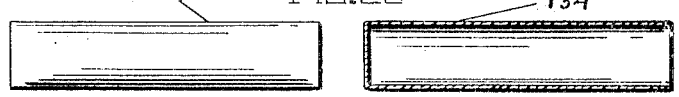
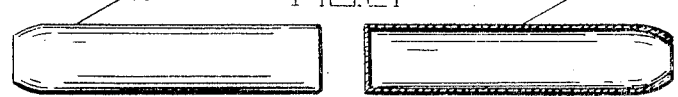
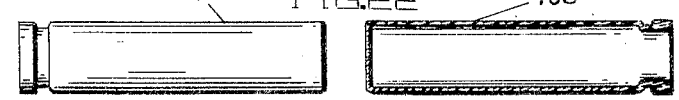

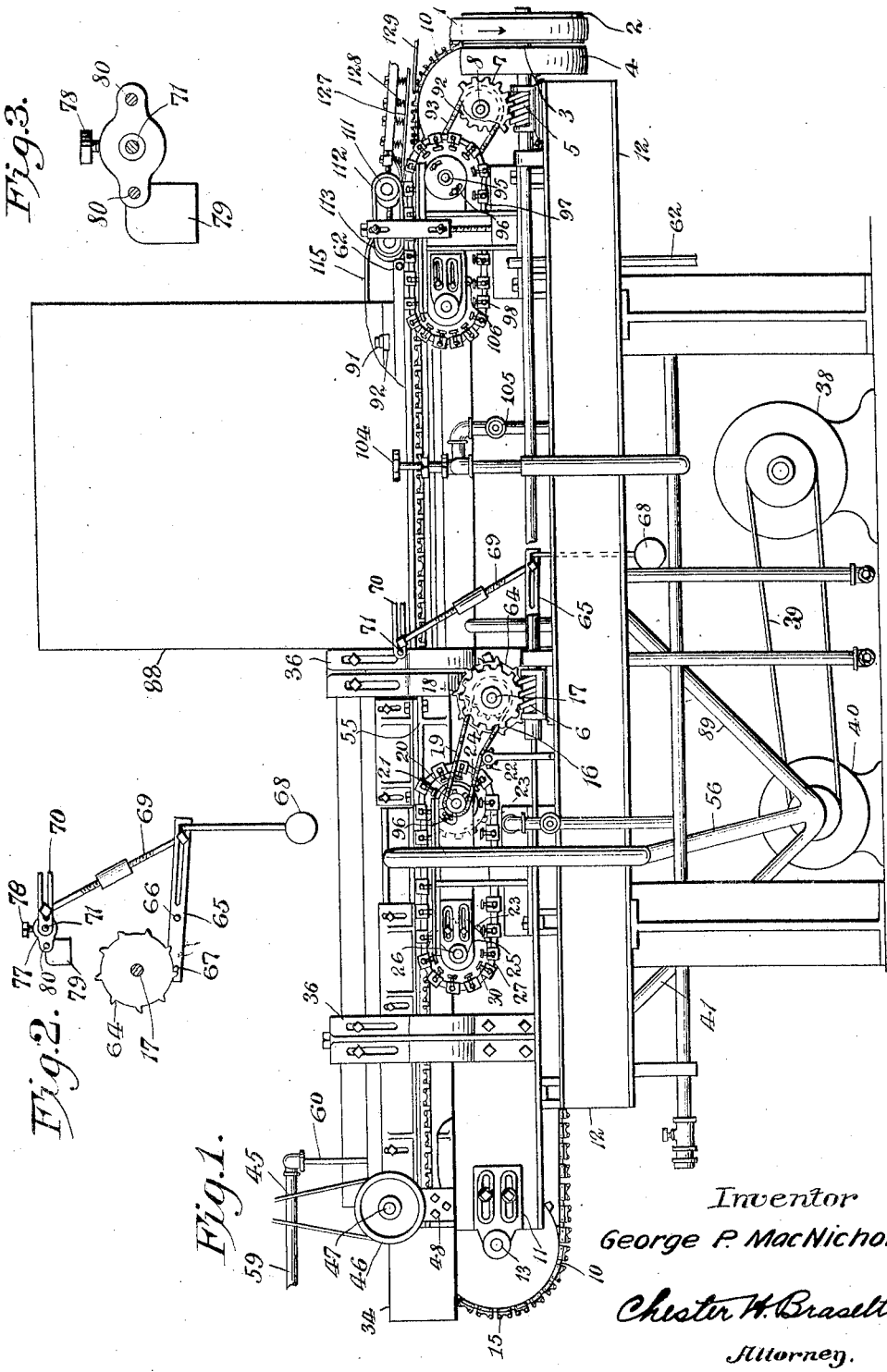

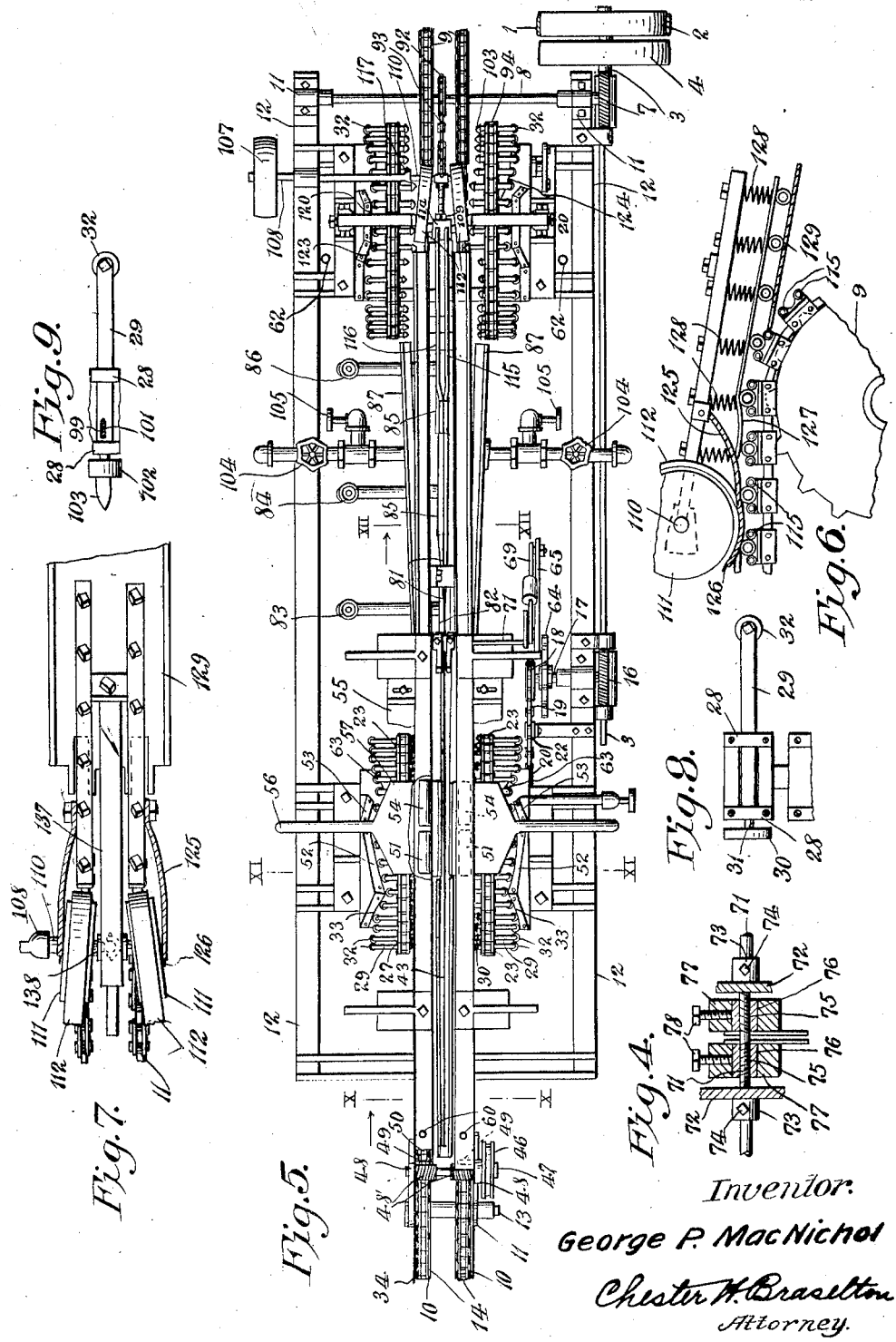

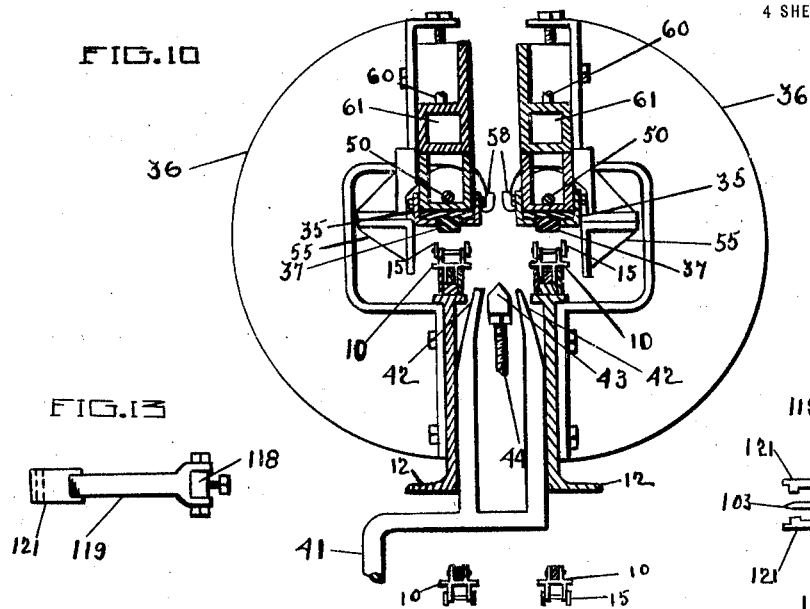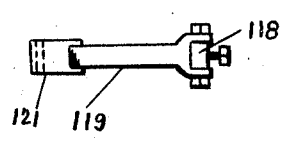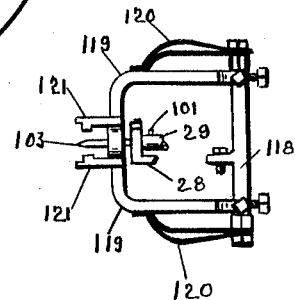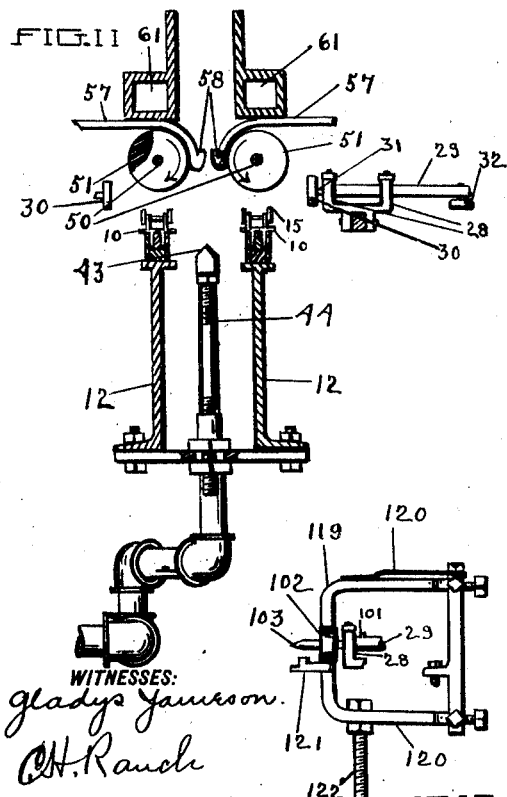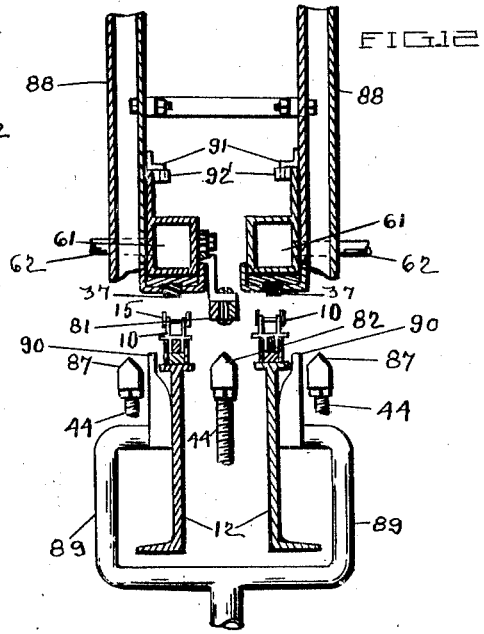

UNITED STATES PATENT OFFICE.

GEORGE P. MacNICHOL, OF TOLEDO, OHIO, ASSIGNOR, BY MESNE ASSIGNMENTS, TO JOHN N. WILLYS, OF TOLEDO, OHIO.

GLASSWARE-FORMING MECHANISM.

1,343,179.　　　　Specification of Letters Patent.　　　Patented June 8, 1920.

Application filed March 4, 1914. Serial No. 822,313.

*To all whom it may concern:*

Be it known that I, GEORGE P. MACNICHOL, a citizen of the United States of America, residing at Toledo, Lucas county, Ohio, have invented new and useful Glassware-Forming Mechanisms, of which the following is a specification.

This invention relates to handling heated ware, especially in connection with forming plastic material.

This invention has utility when embodied in glassware forming machines in the manufacture of vessels as bottles and vials.

Referring to the drawings:

Figure 1 is a side elevation with parts broken away of an embodiment of the invention;

Fig. 2 is a fragmentary detail of the bottom flattening device;

Fig. 3 is a side elevation of one of the elements of the bottoming device;

Fig. 4 is a section through the pair of bottoming device elements; on the line IV—IV Fig. 3;

Fig. 5 is a plan view of the machine of Fig. 1;

Fig. 6 is an enlarged fragmentary detail of the take off device;

Fig. 7 is a plan view of the take off device of Fig. 6;

Fig. 8 is a detail of one of the end guides for the ware;

Fig. 9 is a view of one of the centering elements for the ware;

Fig. 10 is a section on the line X—X Fig. 5, looking in the direction of the arrow;

Fig. 11 is a section on the line XI—XI Fig. 5, looking in the direction of the arrow;

Fig. 12 is a section on the line XII—XII Fig. 5, looking in the direction of the arrow;

Fig. 13 is a plan view of one of the holders of the neck former;

Fig. 14 is a side elevation of the neck formers of Fig. 13, showing upper and lower neck formers and each yieldable;

Fig. 15 shows a detail view in side elevation of a rigid neck former element and a yieldably held centering element coacting therewith.

Fig. 16 is a side elevation of a tube section or blank as received in the machine;

Fig. 17 shows the blank after being medially heated and elongated at such heated portion;

Fig. 18 shows the severed blank sections;

Fig. 19 shows the severed blank sections after flowing to form in rounding off the closed ends;

Fig. 20 shows the closed inner ends of the blank sections after having been acted upon by the flattener to form the vial bottoms;

Fig. 21 shows the blank sections with their outer ends flowed inwardly and thickened by heating; and Fig. 22 shows the completed vials after action upon the sections of Fig. 21 by the neck former mechanism.

The machine may be continuously driven by the belt 1 shown in Fig. 1 as on the loose pulley 2 carried by the shaft 3. When this driving belt 1 is shifted to the fast pulley 4, the shaft 3 is driven to actuate the worms 5, 6. The worm 5 drives the worm wheel 7 on the shaft 8 (Figs. 1 and 5). Fast on the shaft 8 are the sprocket wheels 9 over which pass the sprocket chains or conveyers 10. The shaft 8 is mounted in the bearings 11 carried by the main frame 12. At the remote end of the frame 12 from the shaft 8 are bearings 11 carrying the shaft 13 upon which is mounted the sprocket wheels 14 over which pass the sprocket chains 10 having the roller flights 15 forming anti-friction ware holders. The worm 6 drives the worm wheel 16 on the shaft 17 (Figs. 1 and 5) which has the sprocket wheel 18 thereon driving sprocket chain 19 extending over the sprocket wheel 20 fast on the shaft 21. The slack in this sprocket chain is taken up by the idler 22. This shaft 21 carries sprocket wheels 23 mounted in the bearings 24 carried by the frame 12. The bearings 24 also carry adjustable bearing brackets 25 for the shaft 26 carrying a pair of sprocket wheels 23 similar to the pair of sprocket wheels 23 on the shaft 21. Over these sprocket wheels pass the sprocket chains 27 embodying the guide blocks 28 (Fig. 8) through each of which is reciprocable a rectangular non-rotatable element 29 having roller 30 mounted on the pin 31 extending into the element 29 from the inner end of said element so that said roller 30 may freely rotate, as by contacting the end of a rotating blank, thereby taking retarding friction off said blank when the face of the roller 30 is moved thereagainst by the action of the member 29 through its guiding roller 32 coacting with the cams 33. The cams 33 first move the disks 30 into contacting relation with the ends say of a rotating blank.

In the manufacture of vials, a cylindrical tubular section, of glass may be put between the guide plates 34 to rest in an anti-friction holder 15 on each of the conveyers 10 to be carried by said conveyers under the bars 35 (Fig. 10) which are adjustable in the brackets 36 and carry the yieldable contacting member or soft rubber 37 directly opposing the anti-friction holders 15 of the conveyers or sprocket chains 10. As the sprocket chains travel the blank or ware contacting the rubber 37 is caused to rotate.

The motor 38, (Fig. 1) through its belt 39 drives the fan 40 having duct 41 leading therefrom (Figs. 1, 5, 10) to the fluid discharge means 42 which have upwardly opening outlet slots parallel with the machine way or line of travel of the ware. Between these air discharging passages is mounted the burner 43 having a discharge slot upwardly directed and parallel with the slots 42. The bolt 44 adjustably mounts the burner 43 as to the machine frame 12 so that vertical or lateral adjustment may be had.

This action of the burner on the blank serves to heat the blank and this heating or production of hot ware is maintained local to the portion directly above the burner 43 by the action of the air blast 42 directed upward. The ware on each side of the heated portion thereby provides a cooling blanket on each side of the jet protecting the moving parts of the holders 15 and conveyers 10 as well as the rubber contacting members 37.

As the blank becomes heated centrally, in order to avoid thickening the blank may be elongated by moving the sections transversely of their line of travel as to the way in the machine. This is accomplished by the driving belt 45 driving the pulley 46 on the shaft 47 mounted in the bearings 48 carried by the frame 12. The shaft 47 (Figs. 1, 5) has the oppositely disposed spiral gears 48' coacting with the spiral pinions 49 on the shafts 50. These shafts 50 (Figs. 5, 10, 11) carry the ware contacting rollers 51 which may also be of a yielding material to better engage the ware, such material being rubber. These rollers 51 rotate positively with the under portions moving out as shown in Fig. 11 so that in contacting the ware or blank such blanks are thrust against the disks 30 causing the rollers 32 of the elements 29 to bear against the cam portions 52 and thereby gradually elongate the weakened central portion of the blank as said cam sections are adjusted to the desired pre-determined extent. The rollers 32 are then urged inwardly by the cam portions 53 (Fig. 5) which inward travel is permitted by the idle rollers 54, similar to the live rollers 51. As the blanks pass the rollers 51, 54, they rotate on their own axes as well as have transverse actuation. Upon leaving the rollers 54 the blanks again are rotated by the pressure bar or contacting members 37, and abut adjustable end guides 55.

The sheet air jets or fluid discharge means 42 extend to the region of the rollers 51, 54. To provide a means for counteracting any heating of these rollers as well as deterioration of the rubber, the duct 56 from the fan 40 conveys fluid to the roller jacketing members 57 (Figs. 1, 5, 11) which jacketing members 57 provide a continuous current of air in the member closely adjacent a side of the rollers. These jacketing members 57 have fluid discharge openings 58 upwardly directed, one on each side of the plane of the burner, which serve as current inciting means not only to confine the heat of the burner but quickly remove such heat by upward current directly above the burner.

To contribute to the ease in preventing heat deterioration or overheating of the moving parts of the mechanism, for the ware or machine parts adjacent said ware, fluid circulating passages are provided, there being a water supply line 59 having ducts 60 (Figs. 1, 10) in communication with the fluid passages 61 adjustably supported with the bars 37 by the brackets 36 and extending parallel with the way or line of travel of the conveyers. Outlet ducts 62 (Figs. 1 and 12) serves to carry away the heated water and thus complete the circulation of the liquid through the machine.

The cams 63 (Fig. 5) serve to withdraw the members 29 so that they are in position to be acted upon by the cams 33 when they repeat their circuit in the continuous travel in synchronism with the holders 15, there being a disk 30 directly registering with each of said holders in its travel past the cams 33, 52, 53, 63.

This drawing apart of the blanks during the continued heating thereof effects a separation of the blank into two sections, and a rounding off or flowing of said separated sections to a closed end form.

In the production of bottles or vials it is desirable that the closed end or bottom be flat in many instances. To care for this positively a bottoming device is introduced. Fast on the shaft 17 is the toothed wheel 64 (Figs. 1, 2, 5) timed to have its teeth in synchronism with the ware holders 15. The lever 65 mounted on the fulcrum 66 has pin 67 riding on the teeth of the wheel 64 to rock said lever against the counterweight 68 and thereby through the adjustable link 69 coacting with the arm 70 to rock the shaft 71 (Figs. 2, 3, 4). This shaft 71 is maintained against lateral movement as to its bearings 72 by the collars 73 held by the set screws 74. Intermediate these bearings 72 the shaft 71 has right and left threaded portions 75 upon which are mounted the bushings 76 and as to which the yokes 77 are held by the set screws 78. These yokes 77 carry the bottoming paddles or plates 79 and the yokes are held from rotation by the pins 80 extending therethrough parallel with the shaft 71. As the shaft 71 is rocked by the lever 65 from the wheel 64 the plates or paddles 79 simultaneously move apart and then quickly return to their central or closed position. This quick separation movement is timed to occur just as the blank sections with the plastic bottoms are in position as to the bottoming elements 79 and there accordingly results a gentle pat of short duration in the outward movement which forces the closed end of the blank sections into a plane insuring a flat bottom for the article. The severed and completely bottomed blank sections now contact at their inner ends the central dividing member or adjustable split tongue 81 (Figs. 5, 12) which is heated by the burner 82 as controlled by the valve 83. The heating of this tongue 81 is graduated to permit a uniform cooling of the formed bottom of the vial. The valve 84 may regulate the burner 85 as to the burner 82 while the valve 86 may regulate the next burner section 85' for still less heating than the burners 85 and 82. This tongue member 81 gradually works the blank sections away from each other and during this travel the outer ends are heated by the long narrow burners 87 mounted on adjusting bolts 44. These burners 87 have their exhaust taken up by the flues 88 thereover and the heating action of these burners may be confined to the end portion and kept away from the holder in supplement to the liquid circulating passage 61 by the fluid duct 89 conveying air from the fan 40 to the fluid discharging means 90 parallel with the conveyers 10. The burners 87 may accordingly diverge to allow for the transverse travel of the blank sections as produced by the adjustable central bottoming member or tongue 81. The flues 88 are removably mounted upon the machine by the angle tongues 91 engaging in the brackets 92' (Fig. 12).

Fast on the shaft 8 (Figs. 1, 5) is the sprocket wheel 92 having the sprocket chain 93 driving the sprocket wheel 94 fast on the shaft 95. By the slotted adjustment 96 the sprocket wheels 97 may be adjusted to carry the sprocket chains 98 having guide blocks 28 for the reciprocable members 29 having the transverse actuating rollers 32. The inward recessed end of the member 29 carries the spring 99 against which the bearing 100 is held by the pin 101 so that the collar 102 (Fig. 9) and the centering blade 103 are non-rotatably held by the non-rotatable element 29. The heated outer ends of the blanks passing the burners 87 are brought to a plastic state as the burners are adjusted by the valves 104, 105, and the sprocket chains 98 passing over the sprocket wheels 106, 97, bring in synchronism the centering element 103 for each holder 15 so that each article of ware may have the centering element 103 properly lined up therewith and hold such article during the lip or neck forming operation. The adjustment 96 permits this proper positioning of the centering means 103 as to the holders as does the similar adjustment of the sprocket wheels 23 to their shaft 20 for alining the relatively rotatable disks 30 as to the holders 15.

The driving pulley 107 serves to drive the shaft 108 having the universal connection 109 with the shaft 110 connected to actuate the pulleys 111 carrying the belts 112 passing over the pulleys 113 having the bearing block 114 provided with the liquid chamber to which extends the water supply duct 115 and from which extends the water exhaust 116 (Fig. 5). The adjusting nut 117 serves to take up tension of the belts 112. These belts have a yieldable facing as a contacting member, say of rubber. These belts are driven in the direction of ware travel so that the ware is readily brought thereunder when it approaches the belts and the speed is such that for this short duration of time a high rotative velocity is given the ware and this rotative velocity occurs while the centering means 103 is in active position as also during the neck or neck and lip forming operation.

Mounted in the frame 12 adjacent the pulley 113 is the bracket 118 carrying the upper member 119 yieldably held by the springs 120 to movably carry the upper neck former 121 (Fig. 14) as a non-traveling member, while the centering element 103 may pass therebelow with the blank. Opposing this upper neck forming member 121 is a similar lower neck forming member 121 also held yieldably in position by spring 120 acting upon the lower hinged member 119. While this device of Fig. 14 is adapted to handling the ware, the preferred form is that of the device of Fig. 15 which shows the spring 120 yieldably holding the hinged member 119 against the collar 102 of the centering blade 103 while the actual neck forming is accomplished by the single lower neck forming element 121 rigidly held in the hinged member 120 by the bolt 122, in definite adjusted position and stationary while the traveling ware passes along.

The centering elements are controlled by the adjustable cams 123 timed to coact with the rollers 32 to insert the bladed centering elements 103 in the blanks as the blanks approach the high speed rotating device or belts 112. These centering elements are withdrawn by the positively directing adjustable cam sections 124 so that the reciprocable elements 29 are in position for a repetition of this centering travel in their next movement into alinement with the ware holder 15.

With the ware thus completed and having just been released from the high rotative speed the take off device becomes effective. This device embodies a coil 125 upon a flexible stem 126 and extends adjacent the pulleys 111 to yieldingly engage the completed vials by opposing the holders 15. The vials in passing along under the spiral 125 are held to the carrier and delivered thereby to roll under the flexible tape 127 yieldingly held thereagainst by the springs 128 to pass the completed ware to the chute 129. Notwithstanding high speed of rotation or rapid travel rate of the carrier, the vials are kept in position on the carrier for regular travel therewith and discharge therefrom, avoiding breakage from shifting out of alinement.

In the operation of the machine a length of tube of the desired dimension is placed between the relatively adjustable plates 34 the distance apart of which may be varied by the setting of the brackets in the main frame 12. This blank 130 (Fig. 16) is heated and elongated to produce the blank 131 (Fig. 17) which is the form of the blank as handled by the transverse actuating rollers 51. At this step the heating of the elongated blank 131 results in the production of the blank sections 132 (Fig. 18) which blank sections have the pointed closed inner ends. Continued heating of these ends by drawing them in closer to the burner 43 as effective by the adjustable cams 53 flows these inner ends to a more abrupt or approximately flattened portion, blank sections 133, (Fig. 19). This flattening is completed by the bottoming device blades 79, producing the blank sections 134 (Fig. 20). While the formed bottom is being gradually cooled by the member 81 which is also transversely actuating the blanks as to the way or moving them outward, there is heating of the outer ends of said blanks by the burners 87 to produce the blank sections 135 of Fig. 21. These blank sections which have been rotated up to this point solely by the opposing contacting member, as pressure bar or transverse actuating rollers, are now speeded up by the belts 112 as the nonrotating centering blade 103 enters such plastic end and its collar 102 abuts said end. This cares for the forming of the inside and the end of the vial opposing the bottom. Simultaneously with this action, the fixed or non-traveling neck former 121 of short longitudinal extent and upon one side only of the blank completes the groove or neck to finish the vial 136 of Fig. 22. The completed vial is then delivered to the take off device of Figs. 6 and 7 carried by the extension 137 from the bearing 138 carrying the pulleys 111.

In the machine of this disclosure there is possible a high capacity for output by continuous operation in the production of ware uniform in character. The various devices and mechanisms incorporated herein are relatively adjustable permitting the handling by this machine of blanks of different diameter and different length as well as of varying thicknesses, making possible with a single machine considerable range of utility in the production of ware of different characters and sizes.

What is claimed and it is desired to secure by Letters Patent is:

1. In a machine of the class described, the combination of a conveyer; means for driving said conveyer; means for mounting a plurality of blanks on said conveyer; a burner disposed to heat portions of said blanks; a driven roll substantially parallel to the line of movement of the conveyer adapted to contact with said blanks; and a fluid cooled jacket partially embracing said roll to cool the same.

2. In a machine of the class described, the combination of a conveyer; means for driving said conveyer; means for mounting a plurality of blanks on said conveyer; a burner disposed to heat the central portions of said blanks; a pair of oppositely driven rolls contacting with said blanks on opposite sides of said burner; and a fluid cooled jacket partially embracing each of said rolls.

3. In a machine of the class described, the combination of a conveyer; means for driving said conveyer; means for mounting a plurality of blanks on said conveyer; a burner disposed to heat the central portions of said blanks; a pair of oppositely driven rolls adapted to contact with said blanks on opposite sides of said burner; and a fluid cooled jacket partially embracing each of said rolls and provided with an upwardly opening outlet substantially in line with said burner.

In witness whereof I affix my signature in the presence of two witnesses.

GEO. P. MacNICHOL.

Witnesses:
C. H. RANCH,
GEO. E. KIRK.